United States Patent [19]
Tsai

[11] Patent Number: 5,409,182
[45] Date of Patent: Apr. 25, 1995

[54] FLIGHT VEHICLE

[76] Inventor: Yeong-Shyeong Tsai, No. 141, Fu Hsing Rd., Lu Chou Hsiang, Taipei Hsien, Taiwan, Prov. of China

[21] Appl. No.: 218,761

[22] Filed: Mar. 28, 1994

[51] Int. Cl.6 .................................................. B64C 21/02
[52] U.S. Cl. ...................................... 244/121; 244/208; 104/23.1
[58] Field of Search .................. 244/12.1, 207, 208, 244/209, 203, 213, 200; 104/23.1, 281, 284, 293, 23.2, 282, 290, 285

[56] References Cited

U.S. PATENT DOCUMENTS

| | | | |
|---|---|---|---|
| 1,979,298 | 11/1934 | Trey et al. | 244/208 |
| 2,868,479 | 1/1959 | Kadosch et al. | 244/207 |
| 3,062,483 | 11/1962 | Davidson | 244/207 |
| 3,066,894 | 12/1962 | Davidson | 244/207 |
| 3,361,386 | 1/1968 | Smith | 244/12.1 |
| 3,451,645 | 6/1969 | Wolcott | 244/207 |
| 4,117,995 | 10/1978 | Runge | 244/207 |
| 4,706,910 | 11/1987 | Walsh et al. | 244/200 |
| 5,215,015 | 6/1993 | Iida et al. | 104/23.1 |
| 5,222,689 | 6/1993 | Simuni | 104/23.1 |

FOREIGN PATENT DOCUMENTS 586496 10/1933 Germany .................................. 244/208

Primary Examiner—Galen L. Barefoot
Attorney, Agent, or Firm—Hedman, Gibson & Costigan

[57] ABSTRACT

A flight vehicle includes a base frame in which an accumulating tank is mounted for receiving air. An air entrance device is mounted on the first end of the base frame for introducing air to enter into the accumulating tank. A power supply device is mounted in the base frame for pressurizing air in the accumulating tank. A nozzle device is mounted on an upperside of a first end of the base frame and communicates with the accumulating tank for injecting the pressurized air therefrom along a longitudinal direction of the base frame. A suction device is adjustably mounted on an upperside of a second end of the base frame and is restricted to be disposed between a first position where air injected from the nozzle device is introduced into the suction device and a second position where the suction device stops operating. An elevator device and a rudder device are respectively mounted on an upperside of the second end of the base frame. A wheel assembly is mounted on an underside of the base frame.

7 Claims, 3 Drawing Sheets

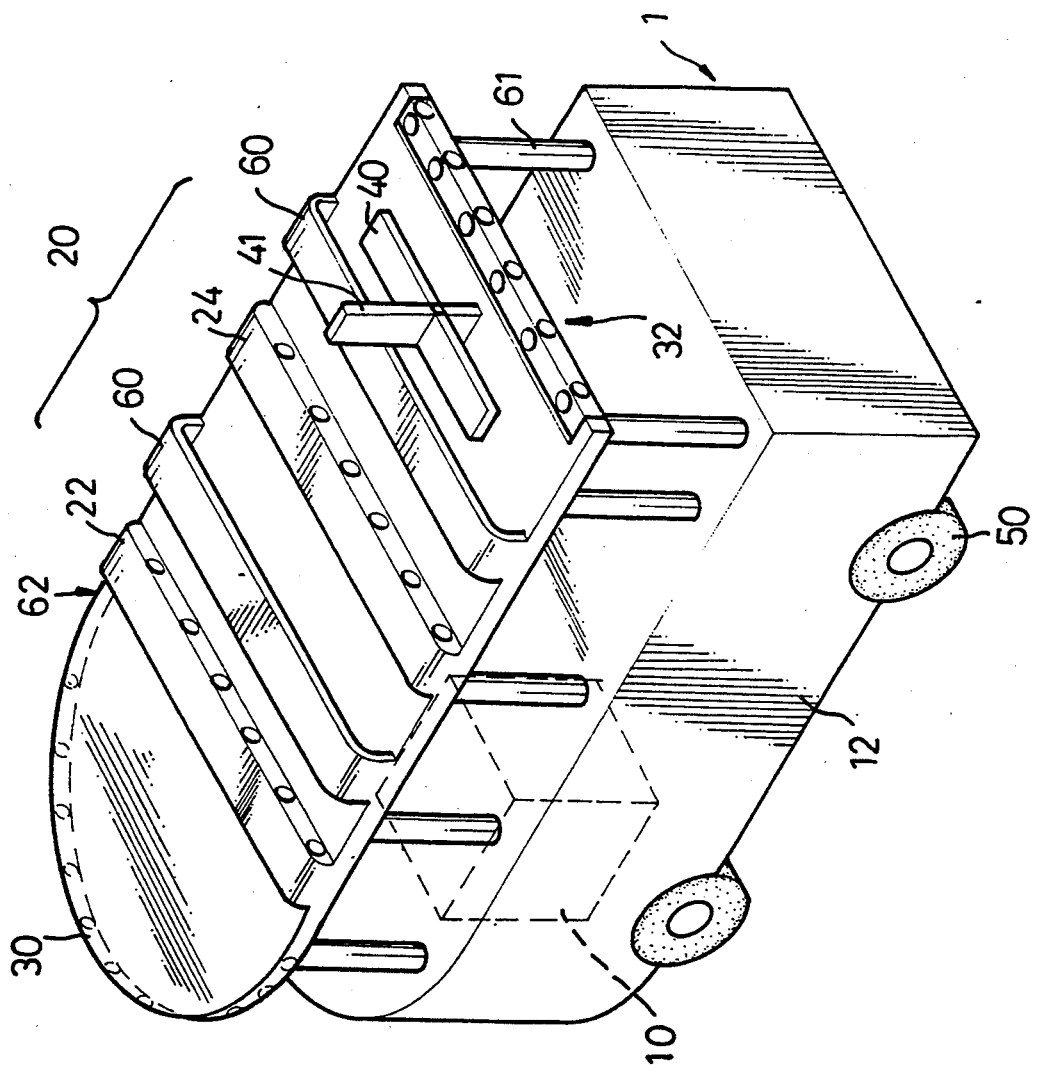
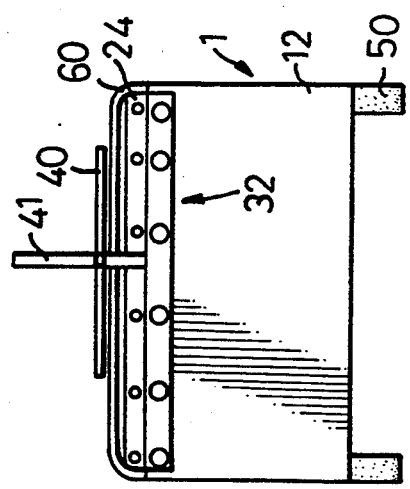
FIG. 3
FIG. 2

FLIGHT VEHICLE

BACKGROUND OF THE INVENTION

1. FIELD OF INVENTION

The present invention relates to a flight vehicle.

2. RELATED PRIOR ART

A conventional flight vehicle has a heavy weight so as to cause a large cost in fuels and energy. In addition, the conventional flight vehicle takes up much space such that it is not easy to take off and land. Further, the conventional flight vehicle has a complex structure so that it is not easy to be controlled and requires much material, thus causing additional costs in manufacturing.

The present invention has arisen to mitigate and/or obviate the afore-mentioned disadvantages of the conventional flight vehicle.

SUMMARY OF THE INVENTION

The primary objective of the present invention is to provide a flight vehicle.

Another objective is to provide a flight vehicle which has a light weight and takes up small space.

A further objective is to provide a flight vehicle which does not need any finite wing device.

A further objective is to provide a flight vehicle which is convenient to take off and land.

In accordance with one aspect of the present invention, there is provided a flight vehicle including a base frame in which an accumulating tank is mounted for receiving air. An air entrance device is mounted on the first end of the base frame for introducing air to enter into the accumulating tank. A power supply device is mounted in the base frame for pressurizing air in the accumulating tank. A nozzle device is mounted on an upperside of a first end of the base frame and communicates with the accumulating tank for injecting the pressurized air therefrom along a longitudinal direction of the base frame. A suction device is adjustably mounted on an upperside of a second end of the base frame and is restricted to be disposed between a first position where air injected from the nozzle device is introduced into the suction device and a second position where the suction device stops operating. An elevator device and a rudder device are respectively mounted on an upperside of the second end of the base frame. A wheel assembly is mounted on an underside of the base frame.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a right side plan view of the flight vehicle as shown in FIG. 1;

FIG. 3 is a perspective view of a flight vehicle in accordance with a second embodiment of the present invention;

DETAILED DESCRIPTION OF THE PREFERRED EMBODIMENTS

Figure 1:
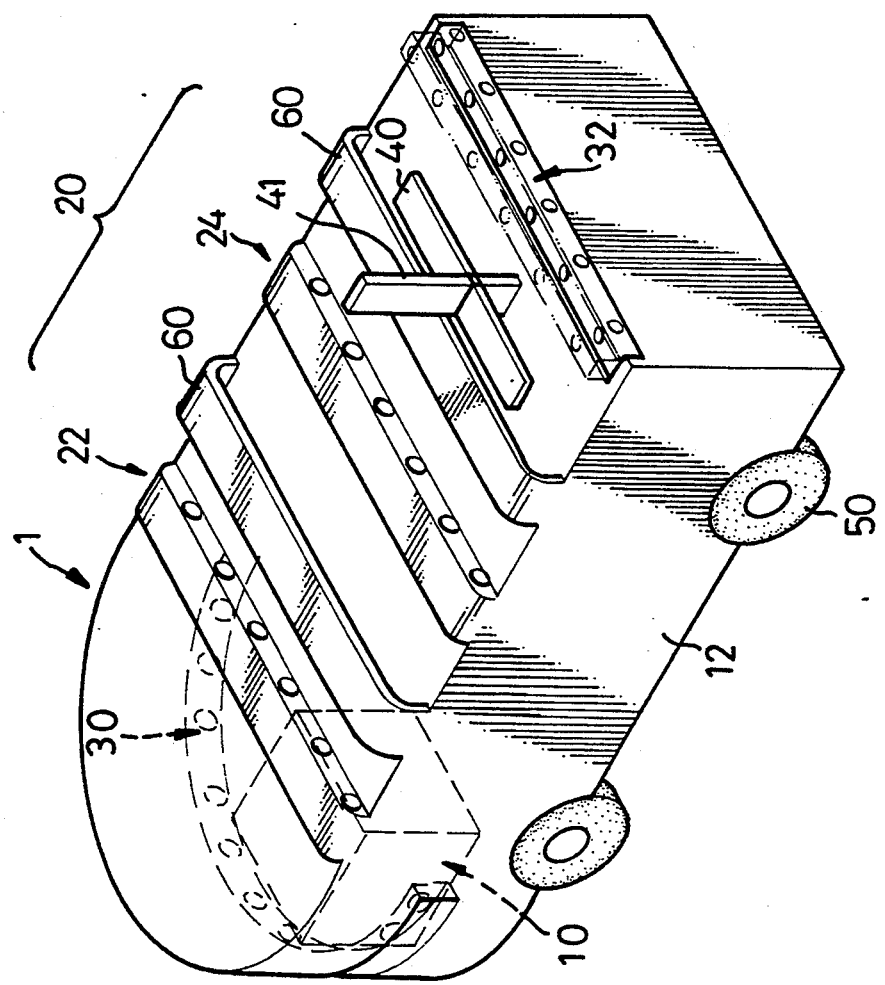
FIG. 1 is a perspective view of a flight vehicle in accordance with a first embodiment of the present invention.

Referring to the drawings, and firstly referring to FIGS. 1 and 2, in accordance with a first embodiment of the present invention, there is provided a flight vehicle 1 which has a light weight comprising a base frame 12 in which an accumulating tank (not shown) is mounted for receiving air. An air entrance means 30 is mounted on a first end of the base frame 12 for introducing air to enter into the accumulating tank of the base frame 12 in which a power supply means 10 is mounted for pressurizing air in the accumulating tank thereof.

A nozzle means 20 is mounted on and upperside of the first end of the base frame 12 and communicates with the accumulating tank for injecting the pressurized air therefrom along a longitudinal direction of the base frame 12. The nozzle means 20 comprises a first nozzle member 22 and a second nozzle member 24 which are spaced away from each other, each of the first and second nozzle members 22 and 24 communicates with the accumulating tank by means of a pipeline (not shown) and has a control valve means (not shown) for controlling the air amount to be injected from the first and second nozzle members 22 and 24. A wheel assembly 50 is mounted on an underside of the base frame 12.

In operation, air is firstly drawn into the accumulating tank through the air entrance means 30 and is synchronously pressurized by means of a compressor (not shown) in the power supply means 10 and is then respectively delivered into the first and second nozzle members 22 and 24 by the pipelines such that the pressurized air is able to be injected from the first and second nozzle members 22 and 24 along a longitudinal direction of the base frame 12, thereby obtaining a thrust of the flight vehicle 1 due to a reaction effect of the injected air flow, and thereby obtaining a lift of the flight vehicle 1 due to a pressure difference between an upperside and an underside of the base frame 12 resulting from the velocity difference therebetween. Thus, the flight vehicle 1 is able to move forwards and rise up due to the thrust and the lift.

Preferably, there is provided two current panel members 60 which are respectively mounted behind the first and second nozzle members 22 and 24 for stabilizing and smoothing the air injected therefrom. It is to be noted that the control valve means in the first and second nozzle members 22 and 24 are capable of controlling the amount and the speed of the air injected therefrom, thereby causing a velocity difference between the first and second nozzle members 22 and 24 and thus causing a pressure difference, therebetween such that the flight vehicle 1 is able to pitch about a transverse axis thereof.

Again referring to FIG. 1, a suction means 32 is adjustably mounted on an upperside of a second end of the base frame 12 and is restricted to be disposed between a first position (shown by phantom lines) where the air flow injected from the first and second nozzle members 22 and 24 is wholly introduced into the suction means 32, thereby reducing the thrust such that the flight vehicle 1 is capable of rising up in a vertical fashion, and a second position (shown by solid lines) where the suction means 32 stops operating such that the flight vehicle 1 is able to fly forward in a sloped fashion. In addition, an elevator means 40 and a rudder means 41 are respectively mounted on an upperside of the second end of the base frame 12. Moreover, a parachute is preferably mounted in the base frame 12 due to safety consideration.

Referring to FIG. 3, in accordance with a second embodiment of the present invention, there is provided a flight vehicle 1 comprising a base frame 12 in which an accumulating tank (not shown) is mounted for receiving air. A plate member 62 is mounted above the base frame 12 and a supporting means 61 connects therebetween. An air entrance means 30 is mounted on a first end of the plate member 62 for introducing air to enter into the accumulating tank. A power supply means 10 is mounted in the base frame 12 for pressurizing air in the accumulating tank. A nozzle means 20 comprises a first nozzle member 22 and a second nozzle member 24 which are mounted on an upperside of the first end of the plate member 62 and respectively communicate with the accumulating tank for injecting the pressurized air therefrom along a longitudinal direction of the plate member 62. As per the above description, a suction means 32 is adjustably mounted on an upperside of a second end of the plate member 62 and is restricted to be disposed between a first position where air released from the first and second nozzle members 22 and 24 is introduced into the suction means 32 and a second position where the suction means 32 stops operating. An elevator means 40 and a rudder means 41 are respectively mounted on an upperside of the second end of the plate member 62. A wheel assembly 50 is mounted on an underside of the base frame 12.

Figure 4:
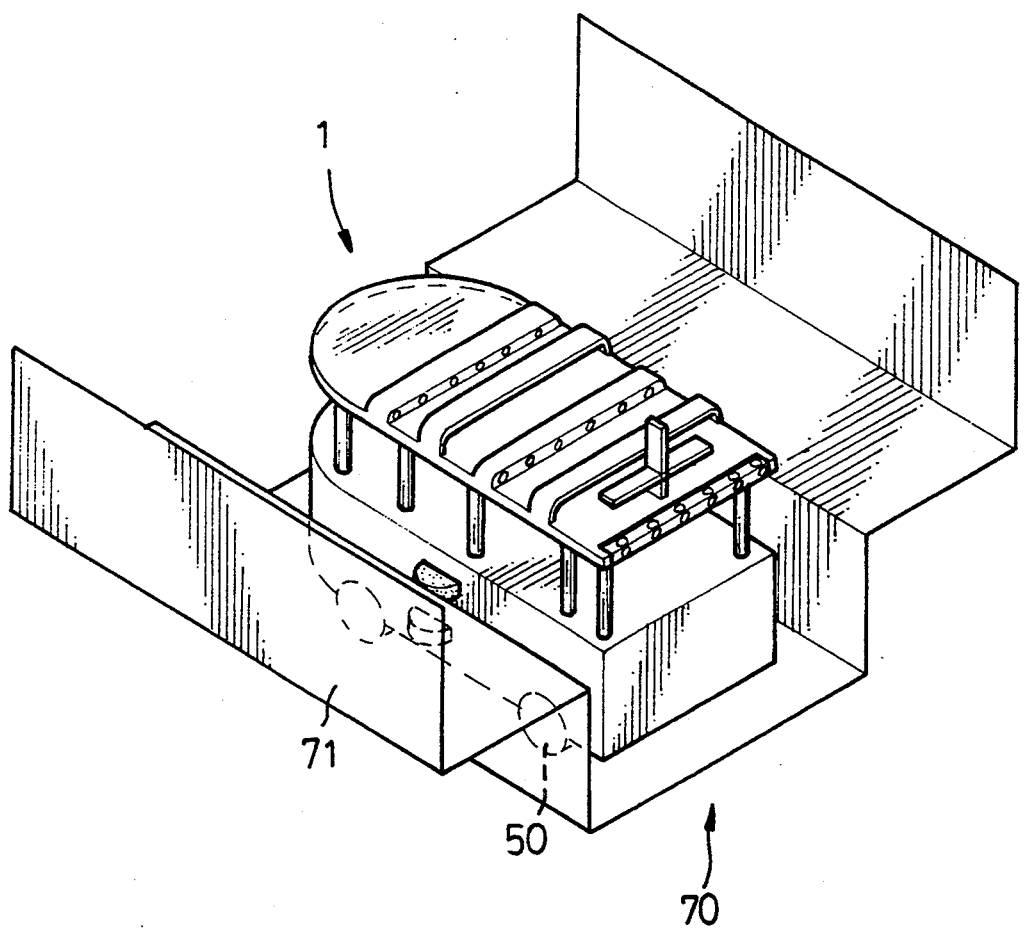
FIG. 4 is a schematic view of a flight vehicle in accordance with a third embodiment of the present invention.
Figure 5:
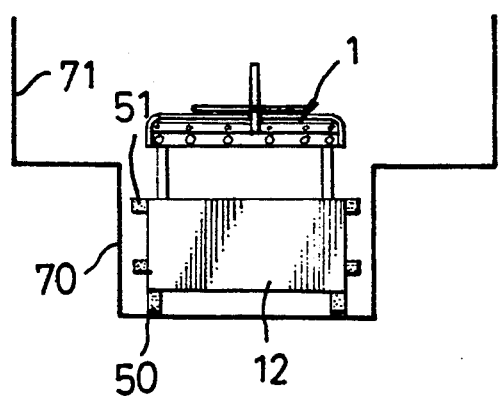
FIG. 5 is a reduced right side plan view of the flight vehicle as shown in FIG. 4.

Referring to FIGS. 4 and 5, in accordance with a third embodiment of the present invention, the flight vehicle 1 as mentioned in the second embodiment is limited to move in a channel 70 which is U-shaped in section, and a further two pairs of lateral wheels 51 are respectively mounted on two sides of the base frame 12. Two transparent wall members 71 are mounted on two side walls of the U-shaped channel 70 for protecting the flight vehicle 1. A sensor means (not shown) is mounted in the U-shaped channel 70 for sensing the instant position of the flight vehicle 1.

Accordingly, by such an arrangement, a flight vehicle in accordance with the present invention has the following advantages and benefits:

(1) The flight vehicle has a light weight such that it is capable of saving cost of fuels and energy.
(2) The flight vehicle takes up small space such that it is convenient for the flight vehicle to take off and land, thus avoiding inefficient use of land areas.
(3) The flight vehicle has a simple structure and is easy to control so as to easily perform its function in a simple transmission fashion.
(4) The flight vehicle does not have any finite wing device so as to reduce waste in material, thus avoiding additional cost in manufacturing.

It should be clear to those skilled in the art that further embodiments of the present invention may be made without departing from the teachings of the present invention.

I claim:

1. A flight vehicle (1) comprising:
a base frame (12) having a first end and a second end;
an accumulating tank mounted in said base frame (12) for receiving air;
an air entrance means (30) mounted on the first end of said base frame (12) for introducing air to enter into said accumulating tank of said base frame (12);
a power supply means (10) mounted in said base frame (12) for pressurizing air in said accumulating tank of said base frame (12);
a nozzle means (20) mounted on an upperside of the first end of said base frame (12) and communicating with said accumulating tank for injecting said pressurized air therefrom along a longitudinal direction of said base frame (12), said nozzle means (20) comprising a first nozzle member (22) and a second nozzle member (24) which are spaced distant from each other, each of said first and second nozzle members (22) and (24) communicating with said accumulating tank of said base frame (12) and having a control valve means for controlling the air amount to be injected from said first and second nozzle members (22) and (24);
two current panel members (60) each respectively mounted behind said first and second nozzle members (22) and (24) for stabilizing and smoothing the air injected therefrom;
a suction means (32) adjustably mounted on an upperside of the second end of said base frame (12) and restricted to be disposed between a first position where air injected from said first and second nozzle members (22) and (24) of said nozzle means (20) is introduced into said suction means (32) and a second position where said suction means (32) stops operating; and
a wheel assembly (50) mounted on an underside of said base frame (12).

2. The flight vehicle (1) in accordance with claim 1, further comprising an elevator means (40) and a rudder means (41) which are respectively mounted on an upperside of the second end of said base frame (12).

3. The flight vehicle (1) in accordance with claim 1, wherein said flight vehicle (1) is limited to move in a channel (70) which is U-shaped in section, two pairs of lateral wheels (51) are respectively mounted on two sides of said base frame (12).

4. The flight vehicle (1) in accordance with claim 3, further comprising two transparent wall members (71) mounted on two side walls of said U-shaped channel (70) for protecting said flight vehicle (1).

5. The flight vehicle (1) in accordance with claim 3, further comprising a sensor means mounted in said U-shaped channel (70) for sensing the instantaneous position of said flight vehicle (1).

6. The flight vehicle (1) in accordance with claim 1, further comprising a parachute mounted in said base frame (12).

7. A flight vehicle (1) comprising:
a base frame (12);
a plate member (62) mounted above said base frame (12) and having a first end and a second end;
a supporting means (61) connecting between said base frame (12) and said plate member (62);
an accumulating tank for receiving air;
an air entrance means (30) mounted on the first end of said plate member (62) for introducing air to enter into said accumulating tank;
a power supply means (10) for pressurizing air in said accumulating tank;
a nozzle means (20) mounted on an upperside of the first end of said plate member (62) and communicating with said accumulating tank for injecting said pressurized air therefrom along a longitudinal direction of said plate member (62), said nozzle means (20) comprising a first nozzle member (22)

and a second nozzle member (24) which are spaced distant from each other, each of said first and second nozzle members (22) and (24) communicating with said accumulating tank and having a control valve means for controlling the air amount to be injected from said first and second nozzle members (22) and (24);

two current panel members (60) respectively mounted behind said first and second nozzle members (22) and (24) for stabilizing and smoothing the air injected therefrom;

a suction means (32) adjustably mounted on an upperside of the second end of said plate member (62) and being restricted to be disposed between a first position where air injected from said nozzle means (20) is introduced into said suction means (32) and a second position where said suction means (32) stops operating;

an elevator means (40) and a rudder means (41) respectively mounted on an upperside of the second end of said plate member (62); and a wheel assembly (50) mounted on an underside of said base frame (12).

* * * * *